(12) United States Patent
Sinclair, II

(10) Patent No.: US 7,983,920 B2
(45) Date of Patent: Jul. 19, 2011

(54) ADAPTIVE COMPUTING ENVIRONMENT

(75) Inventor: Robert E. Sinclair, II, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 760 days.

(21) Appl. No.: 10/715,765

(22) Filed: Nov. 18, 2003

(65) Prior Publication Data

US 2005/0108642 A1 May 19, 2005

(51) Int. Cl.
*G10L 21/00* (2006.01)
(52) U.S. Cl. ................. 704/270; 704/270.1; 704/271
(58) Field of Classification Search .......... 704/270–271
See application file for complete search history.

(56) References Cited

U.S. PATENT DOCUMENTS

| | | | |
|---|---|---|---|
| 5,647,834 A * | 7/1997 | Ron ................................ | 600/23 |
| 5,759,044 A * | 6/1998 | Redmond .................. | 434/307 R |
| 5,918,222 A * | 6/1999 | Fukui et al. ...................... | 707/1 |
| 6,012,926 A * | 1/2000 | Hodges et al. ................. | 434/236 |
| 6,420,975 B1 * | 7/2002 | DeLine et al. ............. | 340/815.4 |
| 6,446,056 B1 * | 9/2002 | Sadakuni ....................... | 706/14 |
| 6,903,762 B2 * | 6/2005 | Prabhu et al. ............... | 348/207.1 |
| 2002/0021278 A1 * | 2/2002 | Hinckley et al. .............. | 345/156 |
| 2002/0103789 A1 * | 8/2002 | Turnbull et al. .................. | 707/3 |
| 2002/0118223 A1 * | 8/2002 | Steichen et al. ............. | 345/745 |
| 2002/0173721 A1 * | 11/2002 | Grunwald et al. ............ | 600/437 |
| 2002/0192625 A1 * | 12/2002 | Mizokawa .................... | 434/236 |
| 2003/0123680 A1 | 7/2003 | Lee | |
| 2003/0153240 A1 * | 8/2003 | DeJule .......................... | 446/227 |
| 2004/0127198 A1 * | 7/2004 | Roskind et al. ............ | 455/412.2 |
| 2004/0225502 A1 * | 11/2004 | Bear et al. ..................... | 704/270 |

FOREIGN PATENT DOCUMENTS

| | | |
|---|---|---|
| EP | A-0 865 188 | 9/1998 |
| GB | A-2 358 553 | 7/2001 |
| JP | 2003174680 | 6/2001 |
| WO | WO 97/33419 A | 9/1997 |

OTHER PUBLICATIONS

Supplementary EPO Search Report, Jan. 27, 2009, Application 04779594.3-2414/1665235 PCT/US2004024580.
EPO Office Action, application 04 779 594.3-2414, Mar. 24, 2009, 10 pages.

* cited by examiner

*Primary Examiner* — Leonard Saint Cyr

(57) ABSTRACT

A method and system for adapting a computing device in response to changes in an environment surrounding the computing device, or in response to the user's stated preferences. The computing device includes one or more sensors that sense the environment. A changed characteristic of the environment is detected. A determination is made as to one or more settings to change in response to the changed characteristic. Then one or more of the settings are changed to cause the computing device to interact with the user in a different mode. A mode may include which inputs, outputs, and/or processes are used to communicate with the user. A mode may also include how an application formats output or receives input.

7 Claims, 6 Drawing Sheets

ADAPTIVE COMPUTING ENVIRONMENT

FIELD OF THE INVENTION

The present invention relates generally to computing devices, and more particularly adapting computing devices to their environments.

BACKGROUND

Computing devices are increasingly becoming a part of everyday life. A user may interact with a computing device that is relatively stationary (e.g., a desktop computer) or with a computing device that is relatively mobile (e.g., a palmtop, wireless phone, and the like). In addition, a user may have many ways of inputting information or receiving information from a computing device. For example, most computers are attached to a keyboard, a monitor, and a mouse. Some computers are also attached to an audio input device, typically a microphone, and an audio output device, typically speakers or headphones.

Not all users prefer or are capable of interacting with computing devices in the same way. For example, some users are blind or vision impaired and may have trouble seeing something displayed on a computer monitor. Others may not be able to distinguish between some colors. Some users may not be able to read or type words. Some ways of displaying graphics (e.g., a pop-out menu) may cause some users to experience an epileptic seizure.

In response to these challenges, some companies have attempted to provide ways of interacting with computing devices. Some of these attempts have been fruitful but they are typically cumbersome for a user to select and configure. For example, a computing device may have an option that enlarges fonts displayed on the screen, but a user may not know that the option exists or may have trouble finding and enabling the option. A blind user, for example, may have difficulty finding an option on a computing device that allows the user to interact with the computing device in a manner appropriate for the user.

What is needed is a method and system to adapt a computing device to their environments (including the user with whom the computing device is interacting). Ideally, such a method and system would automatically detect environment changes and adapt accordingly.

SUMMARY

Briefly, the present invention provides a method and system for adapting a computing device in response to changes in an environment surrounding the computing device. In one implementation, the computing device includes one or more sensors that sense the environment. Via a sensor or sensors, a changed characteristic of the environment is detected. A determination is made as to whether one or more settings are to be changed in response to the changed characteristic. The setting or settings are changed to cause the computing device to interact with the user in a different mode. A mode may include which inputs, outputs, and/or processes are used to communicate with the user. A mode may also include how an application formats output or receives input.

In one aspect of the invention, the user may be prompted before the computing device changes the mode in which it interacts with the user. In another aspect of the invention, the computing device automatically adjusts the mode in which it interacts with the user in response to a change in the environment.

The user may have other ways of changing the mode of the computing device. For example, the user may be able to modify the mode of the computing device by selecting options in a control panel, options menu, or otherwise.

Other advantages will become apparent from the following detailed description when taken in conjunction with the drawings, in which:

DETAILED DESCRIPTION

Exemplary Operating Environment

Figure 1:
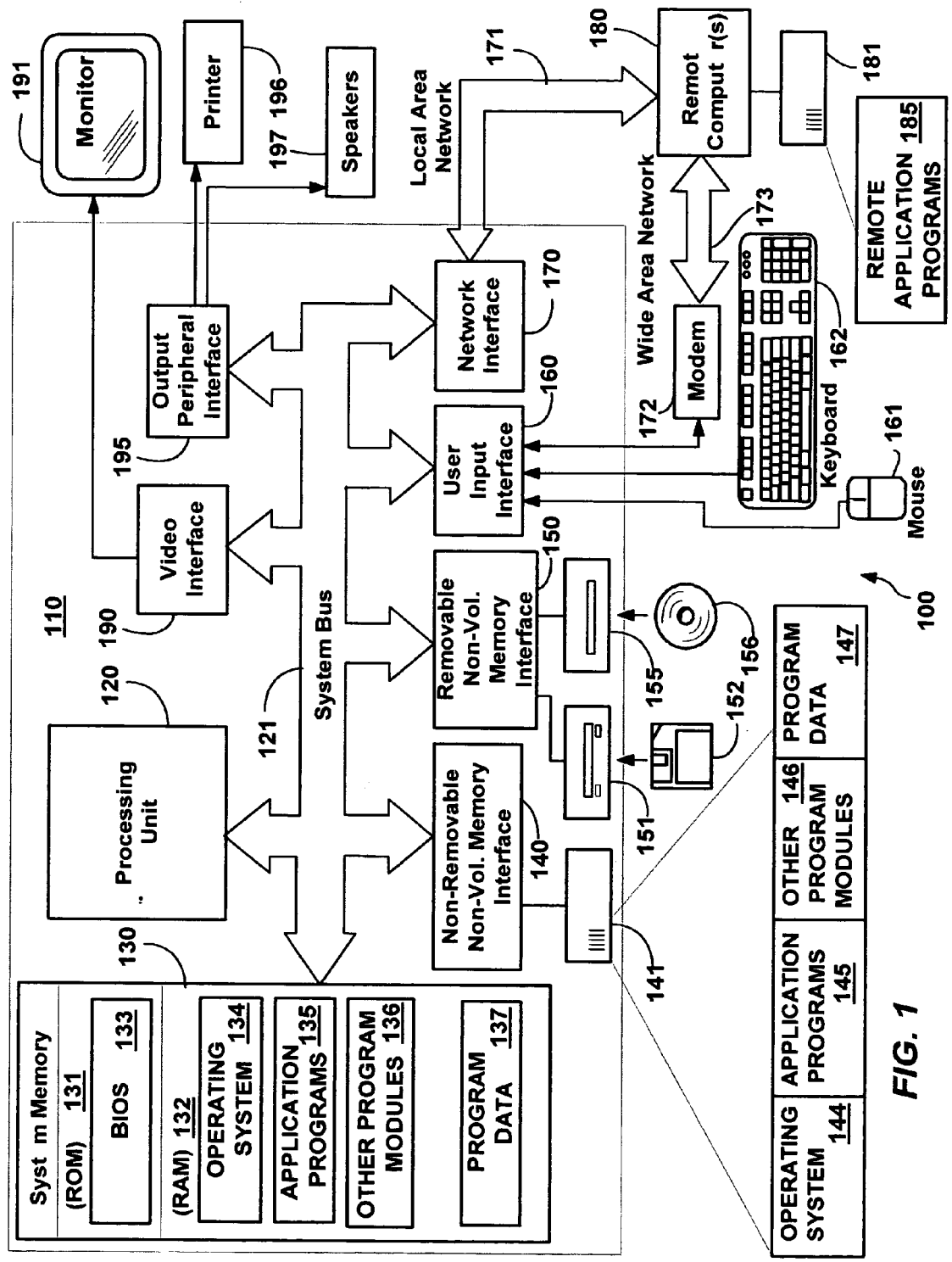
FIG. 1 is a block diagram representing a computer system into which the present invention may be incorporated.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microcontroller-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, and so forth, which perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing the invention includes a general-purpose computing device in the form of a computer 110. Components of the computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer-readable media. Computer-readable media can be any available media that can be accessed by the computer 110 and includes both volatile and nonvolatile media, and removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by the computer 110. Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 140 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/ nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media, discussed above and illustrated in FIG. 1, provide storage of computer-readable instructions, data structures, program modules, and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers herein to illustrate that, at a minimum, they are different copies. A user may enter commands and information into the computer 20 through input devices such as a keyboard 162 and pointing device 161, commonly referred to as a mouse, trackball or touch pad. Other input devices (not shown) may include a microphone, joystick, game pad, satellite dish, scanner, a touch-sensitive screen of a handheld PC or other writing tablet, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 190.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160 or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Exemplary Systems for Adapting to an Environment

Figure 2:
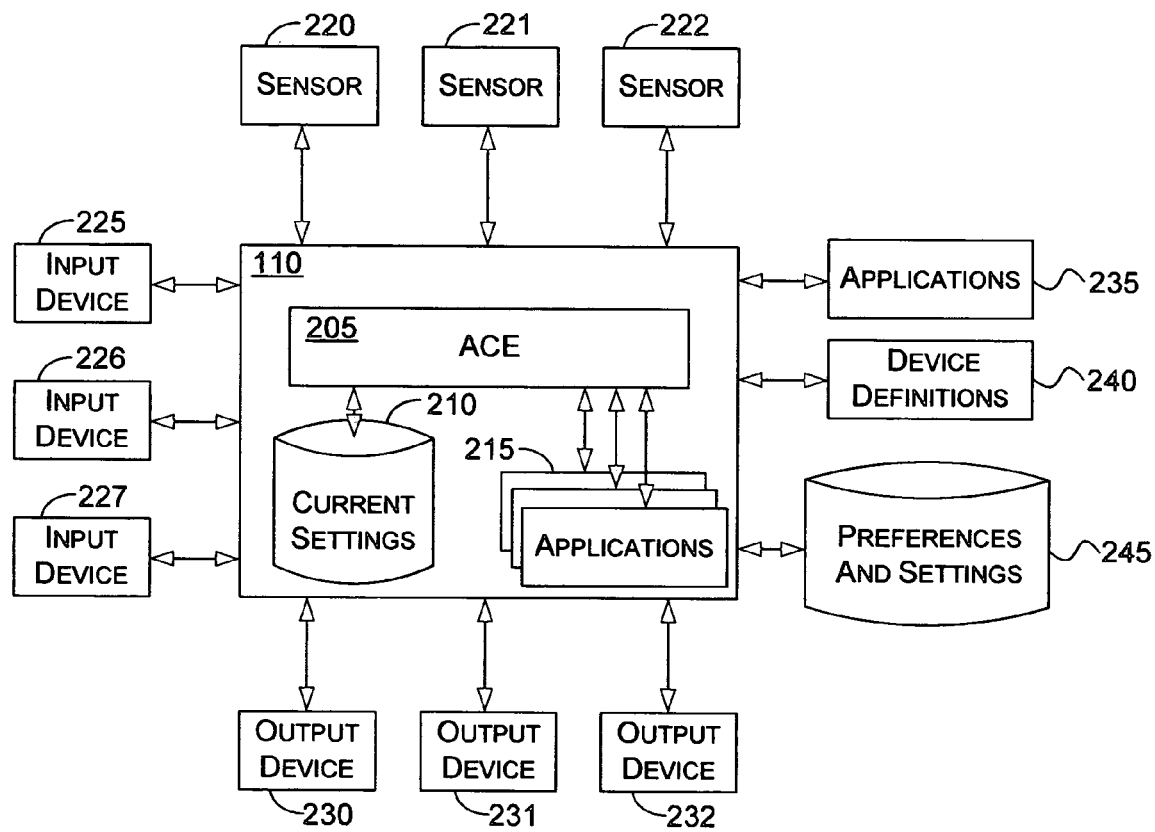
FIG. 2 is a block diagram representing a system that can adapt to an environment in accordance with an aspect of the invention.

FIG. 2 is a block diagram representing a system that can adapt to an environment in accordance with an aspect of the invention. A computer 110 includes an adaptive computing engine (ACE) 205. As represented in FIG. 2, the computer 110 is connected to sensors 220-222, input devices 225-227, and output devices 230-232. Note that three sensors, input devices and output devices are shown in FIG. 2, however it is understood that any practical number may be in a given system, and that there may be different numbers of sensors, input devices and/or output devices in a given system.

In general, the sensors 220-222 sense characteristics regarding the environment in which the computer 110 resides and may provide these characteristics to the ACE 205. A sensor may be added or removed dynamically, such as done through a plug-and-play mechanism. A sensor may be built into or separate from the computer 110. A sensor includes any device that is capable of detecting a characteristic/feature of the environment. Note that the concept of a computer's environment includes the current user or users with whom the computing device is interacting. Exemplary sensors include photocells, microphones, GPSs, gyroscopes, galvanic skin response strips, cameras, heat sensors, motion sensors, humidity sensors, and the like. Some examples of how some of these sensors may be used are described in more detail below.

A photocell may be used, for example to measure light incident to a display. For example, the computer 110 may be a notebook computer, a palmtop, or personal digital assistant (PDA). The user may carry the computer 110 from an environment with artificial lighting outside into the sunlight, and vice versa. The sunlight may make the display of the computer 110 difficult to read at the display's current intensity. Based on the intensity of light that the photocell is measuring and reporting, the ACE 205 may adjust the intensity of a display connected to the computer 110 so that the display is still readable in the brighter light. When the computer 110 is brought back inside and the intensity of the light diminishes, the ACE 205 may decrease the intensity of the display to conserve battery power, for example.

Alternatively, or in addition, the ACE 205 may indicate that information should be communicated to a user via sound so that the user can still obtain information from an output device of the computer 110 if bright light makes the display unreadable.

A microphone may be used to measure ambient noise levels. For example, if the computer 110 is a mobile device such as a cellular phone, the computer 110 can detect (through a microphone) an increase in background noise. In response, the ACE 205 could increase the volume of the handset to help the user hear in the increased noise of the environment. When the background noise decreases, the ACE 205 could automatically reduce the volume of the handset. The ACE 205 could enter into a "no audio" mode if the background noise reached or exceeded a predefined or selected threshold. Note that a fixed computer can also adjust output volume based on background noise levels.

A GPS (global positioning system) sensor may be used to determine a location and provide output accordingly. For example a blind person at an airport may be carrying a portable computing device, and may be seeking a gate to which he or she needs to go to catch a flight. The computing device may include a GPS and speakers, whereby the computing device may detect the position through the GPS and direct the person to the gate via the speakers.

One or more gyroscopes may be used to detect movement. For example, one or more gyroscopes may be attached to an input device to detect the direction in which the input device is being moved. For example, one or more gyroscopes may be attached to a glove-like mechanism to track the movements of a user's hand. This might be done, for example, to detect sign language gesturing or for use as a manipulation device (e.g., as a mouse capable of detecting movement along multiple axes).

A galvanic skin response strip can be used to detect anxiety or state changes in a user. For example, the galvanic skin detector may sense a user's anxiety level with respect to an application that has just been installed. The ACE 205 may then adjust the behavior of the application accordingly. For example, the application may provide hints, wizards, or help assistants, may remove advanced options, may simplify the user interface, and so on.

A camera is another sensor, and can, for example, be used to detect movement and enable face recognition. For example, used in conjunction with face recognition, a camera may detect which user was interfacing with a computing device. The computing device could then adjust the way it interacts based on preferences and settings associated with that user.

It will be recognized that other sensors may also be used, alone or in conjunction with other sensors. Further, the above-mentioned sensors may be used in different ways than those mentioned without departing from the spirit or scope of the present invention.

Input devices 225-227 include any devices or processes that a user may use to provide input into the computer 110. Input devices 225-227 may include a keyboard, mouse, microphone, pen, camera, sip-and-puff headset, head tracking or eye tracking device, natural language input, Morse code input device, and the like.

An input device may include a simplified mechanism for interacting with a program. For example, an input device may comprise a process associated with a text input box that allows a user to type in what is desired instead of finding the desired option in a menu. For example, to turn on bold in a word processing application, the user may type "bold on" or the like in the text input box. As another example, instead of searching through menus to turn on an autocorrect feature, a user may type "autocorrect on" in the text input box.

Output devices 230-232 include any devices or processes that can provide information to the user or to another device. Output devices 230-232 may include, for example, a display, a Braille output device, a printer, a file, closed-captioning output, synthesized speech, other audio output, and the like.

It will be recognized that some input devices may also be sensors, and vice versa. For example, a keyboard may be used to sense when a user is using the keyboard. A camera or motion sensor may be used to sense motion or proximity. A microphone may receive voice input from a user and/or measure ambient noise.

It will also be recognized that some output devices may also be input devices and vice versa. For example, a touch screen may display information to a user and receive input from the user. A device comprising a combination of two or more of a sensor, input device, and output device is within the spirit and scope of the present invention.

The ACE 205 receives input from sensors 220-222, input devices 225-227, and applications 215. In addition, the ACE 205 may read or write data to a preferences and settings database 245. The preferences and settings database 245 may include information related to preferred appearance (e.g., color, contrast, size, fonts, text verses images, and the like), preferred input (e.g., keyboard, mouse, pen, voice, natural language, Morse code, and the like), preferred output (e.g., visual, audio, haptic, print, olfactory, and the like), preferred UI complexity, preferred timing (e.g., timeout periods, flash rates, double click speed, and the like), preferred multimedia settings (e.g., animation, video, audio, closed captioning, audio description, and the like), preferred presentation effects (e.g., skinning that is adapted and can be selected for each audience), and experience level of the user. The ACE 205 may adjust input and output modes and/or the way applications interact with a user based on data contained in the preferences and settings database 245. For example, the ACE 205 may adjust colors, fonts, font sizes, animation settings, themes, backgrounds, or any other modifiable user interaction mode based on this data.

The preferences and settings database 245 may be stored locally such as on a hard disk or otherwise, remotely such as on a server, or on a removable storage device such as a compact disk or a USB memory device. The preferences and settings may be accessed by using a username and password, or some other security mechanism such as a smartcard, thumbprint scanner, retina scanner and the like. For example, to obtain the preferences and settings from a remote device, a user may log onto a remote server and enter a username and password. The user may log onto the remote server when the user is on any computing device that can access the remote server. This allows the ACE 205 to access the user's preferences and settings even when a user is using a computer other than the user's own (e.g., at a public library or elsewhere). With a removable storage device, the user may carry the device and connect it to any computing device that can read the storage device. Then, the computing device can use the preferences and settings to adapt itself to the user. After the user is finished using the computing device, the computing device may revert to default operation.

The ACE 205 may download drivers from device definitions 240. Such downloads may be done automatically or after prompting a user. For example, after a user attaches the user's preferences and settings database 245 (e.g., in the form of a USB memory device) to the computer 110, the ACE 205 may determine that the computer 110 needs some device drivers in order to appropriately interact with the user. The ACE 205 may then automatically locate these device drivers (e.g., in the device definitions 240) and install them. After the user has finished using the computer 110, the ACE 205 may then automatically uninstall the device drivers. The device definitions 240 may be stored locally to the computer 110, may be located on the same medium that stores the user's preferences and settings, or may be located on a remote device accessible through a network, such as the Internet. A website link to a source of a driver may be part of the device definitions.

Similarly, in response to a user's preferences, the ACE 205 may download applications 235 from another computer. For example, after a user attaches the user's preferences and settings database 245 (e.g., in the form of a USB memory device) to the computer 110, the ACE 205 may determine that the user uses a particular screen reader that is available on a remote server. The ACE 205 may then download and install the screen reader onto the computer 110. After the user logs off the computer 110, the ACE 205 may uninstall the screen reader. The applications 235 may be located using a Web service. Such a Web service may use a protocol in accordance with the Universal Description, Discovery and Integration (UDDI) protocol, for example. The applications may also be on the same medium as the user's preferences and settings database 245.

The ACE 205 may not download some device drivers or applications if such device drivers or applications are inappropriate for the computer 110. For example, an alternative keyboard driver for a PDA might not be very applicable for a computer that has a full-sized keyboard or for a cell phone.

As described above, the ACE 205 may receive input from application 215. For example, the ACE 205 may receive information from a word processing application that indicates that the user frequently adjusts the zoom of the word processing application to 200 percent. Based on this information, the ACE 205 may determine that the user has trouble seeing information displayed at a small size. The ACE 205 may ask the user if the user would like other applications also displayed at a larger zoom setting. Alternatively, the ACE 205 may automatically adjust the zoom setting on other applications. In addition, the ACE 205 may remember the zoom setting the user frequently sets for each application and instruct each application to display at that zoom setting upon startup. This may be done without the user manually going to a preferences page and setting a zoom option. As is understood, any of these options may be user configurable, e.g., to override a default behavior.

The applications 215 may provide information to the ACE 205 as to the nature of the information with which the applications 215 are dealing. For example, a user may be browsing bank account information or a secure site. Even if ambient noise increases, the ACE 205 may determine that it should not switch to audio output or increase the volume of audio already being output because of the private nature of the information the application is outputting.

In one implementation, at least some of the applications 215 need not be aware of how their input is received or how their output is sent. In some embodiments, the applications 215 may adjust what they output or receive depending on the nature of the output or input devices. In other embodiments, the ACE 205 (or some other component) translates the standard output of the applications 215 into output suitable for the selected output device or devices and environment. Likewise, the ACE 205 (or some other component) may translate the input of the selected input device or devices into input acceptable to the applications 215.

The ACE 205 or one of the applications 215 may receive or collect information regarding a user's typing patterns. This information may indicate that the user has problems associated with pressing multiple keys at once (e.g., control-alt-delete, control-c, shift-s, and the like). In response to this information, the ACE 205 may ask the user whether the user wishes to enable sticky keys or the ACE 205 may automatically enable sticky keys. If the ACE 205 automatically enables sticky keys, the ACE 205 may notify the user that the feature of sticky keys has been enabled. The feature of sticky keys causes a control or alt key to effectively remain depressed until the next key is pressed.

Similarly, the ACE 205 may determine that a user has problems associated with pressing only one key at a time. In response, the ACE 205 may ask the user whether the user wishes to enable filter keys or the ACE 205 may automatically enable filter keys and notify the user accordingly. The feature of filter keys ignores repeated keystrokes or keys that are barely pressed.

If the ACE 205 determines that a user has problems associated with special keys (e.g. Caps Lock, Num Locks, and the like), the ACE 205 may enable toggle keys, automatically or after asking the user. Toggle keys causes an audible warning when the state of a special key changes. This may help the user avoid typing mistakes.

In certain conditions, the ACE 205 may inform the user about serial keys and ask if the user would like to use this feature. Serial keys allows a user to connect and use an external, alternative input device instead of a traditional keyboard or mouse.

It will be recognized that information about the user's typing patterns may be used in other ways to adapt to the user's needs without departing from the spirit or scope of the invention.

The ACE 205 or one of the applications 215 may track the amount of time a user has been using the computer 110 over a period of time. If the user has been using the computer 110 over an extended period of time, the ACE 205 may change the output to make it easier for the user to interact with the computer 110. For example, the ACE 205 may automatically or upon command increase the font size or intensity to assist the user. Alternatively, the user may indicate that the user wishes to interact with computer 110 through speech and audio. The computer 110 may then begin receiving input through a microphone and sending information to the user through speakers.

In response to the input it receives, the ACE 205 may cause output devices 230-232 to change their output to be conducive to conveying information in the environment. The ACE 205 may also store settings in a database including current settings 210 or in a preference and settings database 245.

The current settings 210 may include information that indicates how the computer 110 should behave in interacting with the user. For example, the current settings 210 may include information that indicates appropriate font sizes, color schemes, whether sticky keys have been enabled, whether speech input is enabled, and other input and output options. When the current settings 210 are changed, a mechanism, such as an operating system component or otherwise, may broadcast the changes to all open applications.

The ACE 205 may detect when devices have been attached or unattached from the computer 110 and take action accordingly. For example, when a Braille output device has been attached to the computer 110, the ACE 205 may instruct applications that they are likely interacting with a user who may be vision impaired. The applications may adjust their output accordingly or rely on the ACE 205 to make a translation appropriate to the Braille output device. Upon the attachment of a new device to the computer 110, the ACE 205 may ask the user regarding the user's preferences. For example, upon the attachment of a Braille output device, the ACE 205 may ask the user whether the user wishes to communicate via the Braille output device. Upon removal of a display, the ACE 205 may ask the user whether output should be done via audio and/or print.

It will be recognized that the ACE 205 does not need to change the way data is stored in order to output data using different output devices or to different users. For example, a graphics application may include a diagram that is difficult to view for someone who is color blind. The ACE 205 can cause the diagram to be displayed in color that is more appropriate for the user without changing the original colors or file associated with the diagram.

Figure 3:
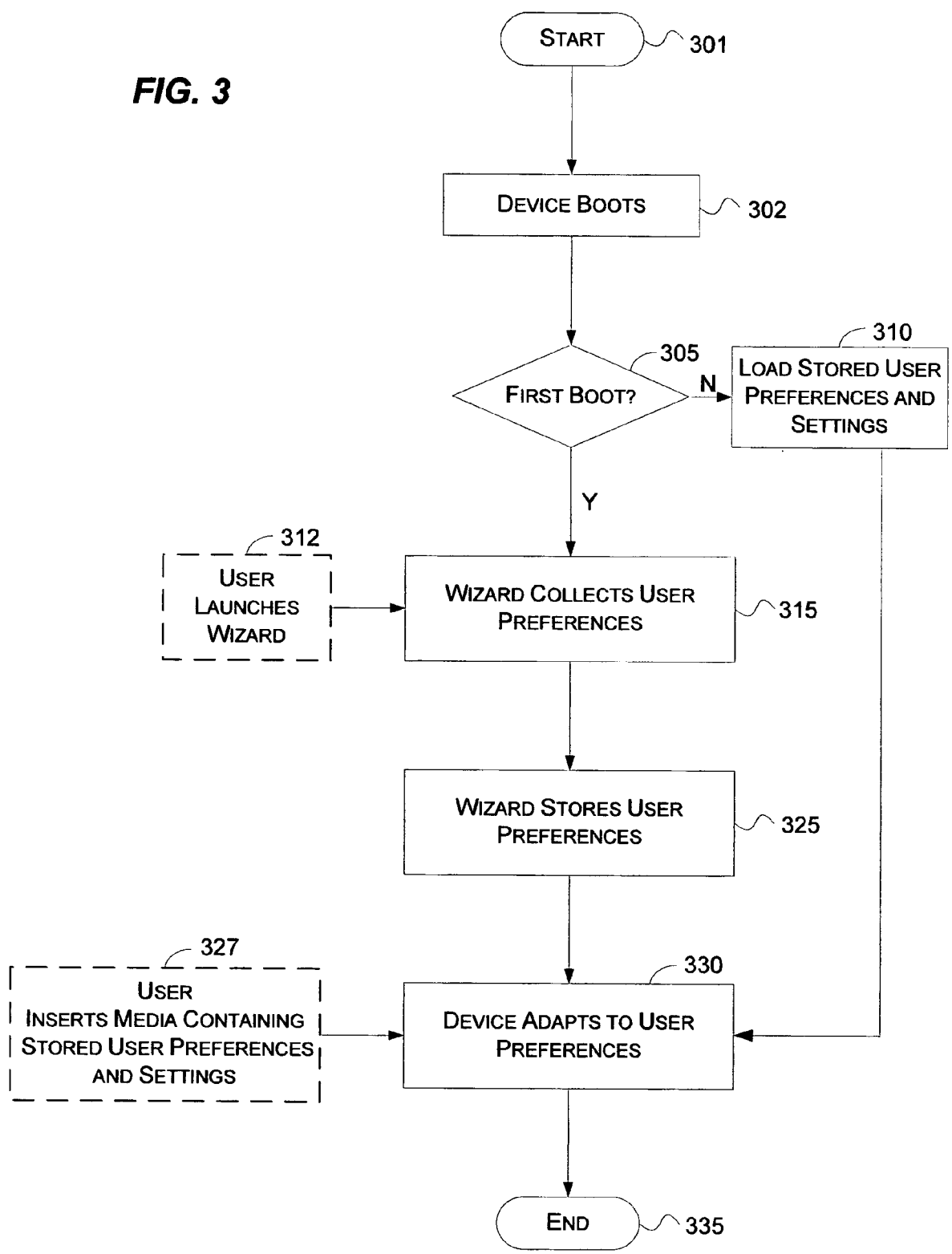
FIG. 3 is a dataflow diagram that generally represents exemplary steps that may occur to obtain and use user preferences in accordance with various aspects of the present invention.

Turning to an explanation of the operation of the present invention, FIG. 3 is a dataflow diagram that generally represents exemplary steps that may occur to obtain and use user preferences in accordance with various aspects of the present invention. The process begins at block 301. At block 302, the device boots. In booting up, the device may present output that is intended to be understandable by a variety of users. For example, the device may speak the information to the user in addition to displaying the information on a display.

At block 305, a determination is made as to whether this is the first time the device has booted. If so, processing branches to block 315; otherwise, processing branches to block 310 where user preferences and settings previously saved are loaded.

At block 315, the wizard collects the user preferences. At block 325, the wizard stores the user preferences. At block 330, the device adapts to the user preferences in light of the environment in which the device is operating.

Dashed blocks 312 and 327 represent events that may occur to obtain user preferences. The user preferences subsequently obtained may replace or augment the preferences currently active on the device. For example, a user may wish to provide more preferences so that a device will be better able to adapt to the user. At block 312, the user indicates that the user wishes to have a wizard collect user preferences. After block 312, processing continues at block 315 and actions described previously are performed.

As another example, a user may carry the user's preferences and settings on removable media (e.g., such as a USB memory device). Upon accessing a computing device, the user may insert the media so that the computing device can adapt to the user's preferences without re-entering all the preferences manually. For example, at block 327, a user inserts media containing stored user preferences and settings. A user may insert the media at any time (even before the device boots). After the device has detected the inserted media, the device may then read the user preferences and settings contained thereon and adapt to the user preferences and settings (block 330).

Figure 4:
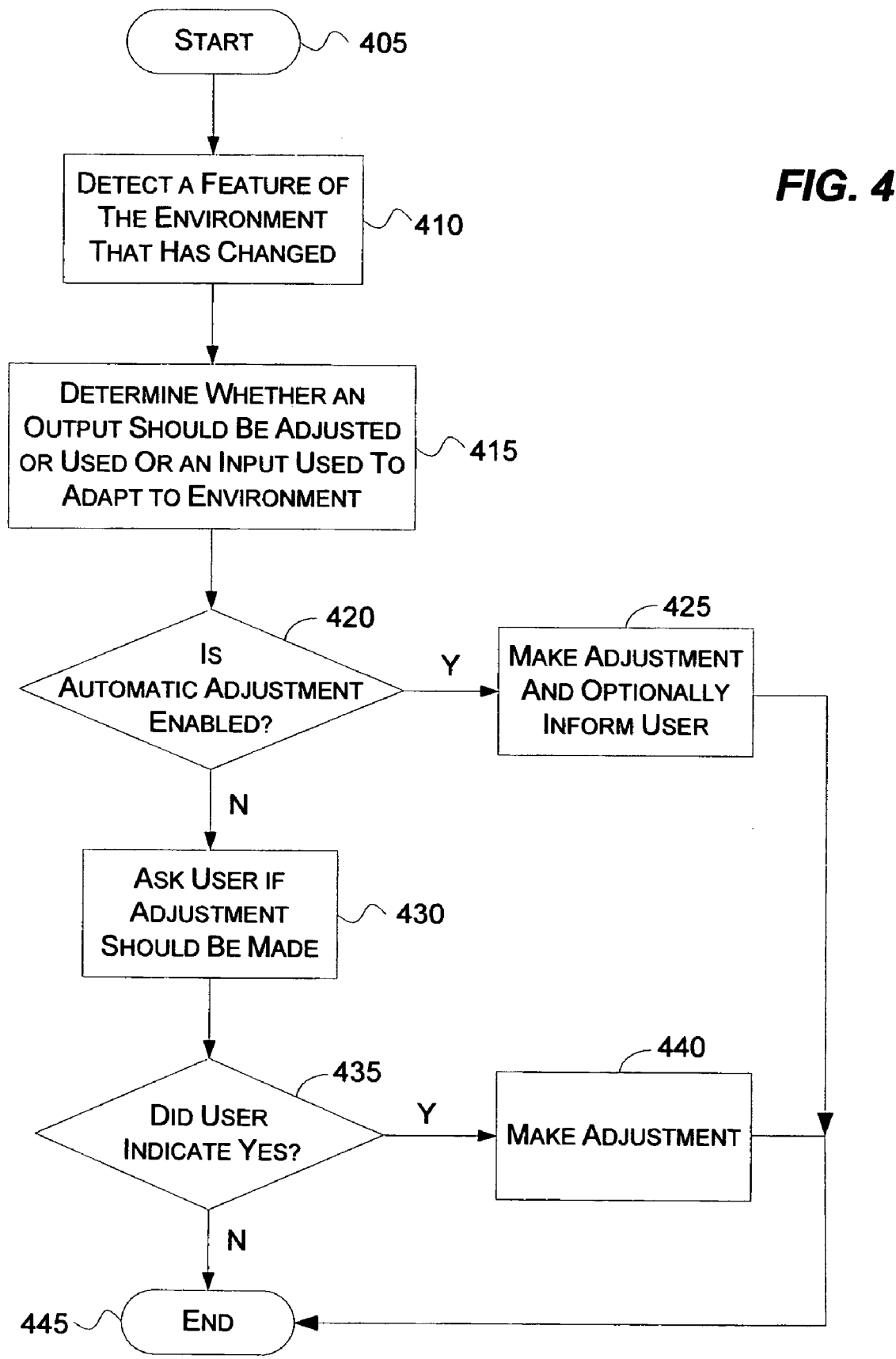
FIG. 4 is a dataflow diagram that generally represents exemplary steps that may occur to adapt to an environment in accordance with various aspects of the present invention.

FIG. 4 is a dataflow diagram that generally represents exemplary steps that may occur to adapt to an environment in accordance with various aspects of the present invention. The process begins at block 405.

At block 410, a characteristic of the environment that has changed is detected. The characteristic may be that a sensor has detected a change in the environment, that a new input or output device has been detected or enabled, that an input or output device has been removed or disabled, that a user has logged onto the system, some combination of the above, and the like. For example, a camera or motion sensor may detect movement that indicates that a user has come into the room. A light sensor may detect that more light is hitting a display screen. A microphone may detect a change in ambient noise. Other characteristics previously described herein, or any other characteristic that has changed may be detected.

At block 415, a determination is made as to whether an output should be adjusted or an input used to adapt to the environment. For example, an output such as a display may have the intensity adjusted to account for more light. In response to a Braille output device being connected to a computing device, the system might start using the Braille output device. In response to a microphone being attached to the computing device, speech recognition may be enabled.

At block 420, a determination is made as to whether automatic adjustment is enabled. If so, processing continues at block 425; otherwise, processing continues at block 430. A user may indicate, for example, that the user wishes to use the microphone to interact with the computing device.

At block 425, the adjustment is made and the user is optionally informed. At block 430, the user is asked if the adjustment should be made. For example, when the user plugs in a Braille output device, the user may be asked if the Braille output device should be used to convey information to the user.

At block 435, if the user has indicated that an adjustment should be made, processing branches to block 440 where an adjustment is made; otherwise, processing branches to block 445. At block 445, the process ends.

Figure 5:
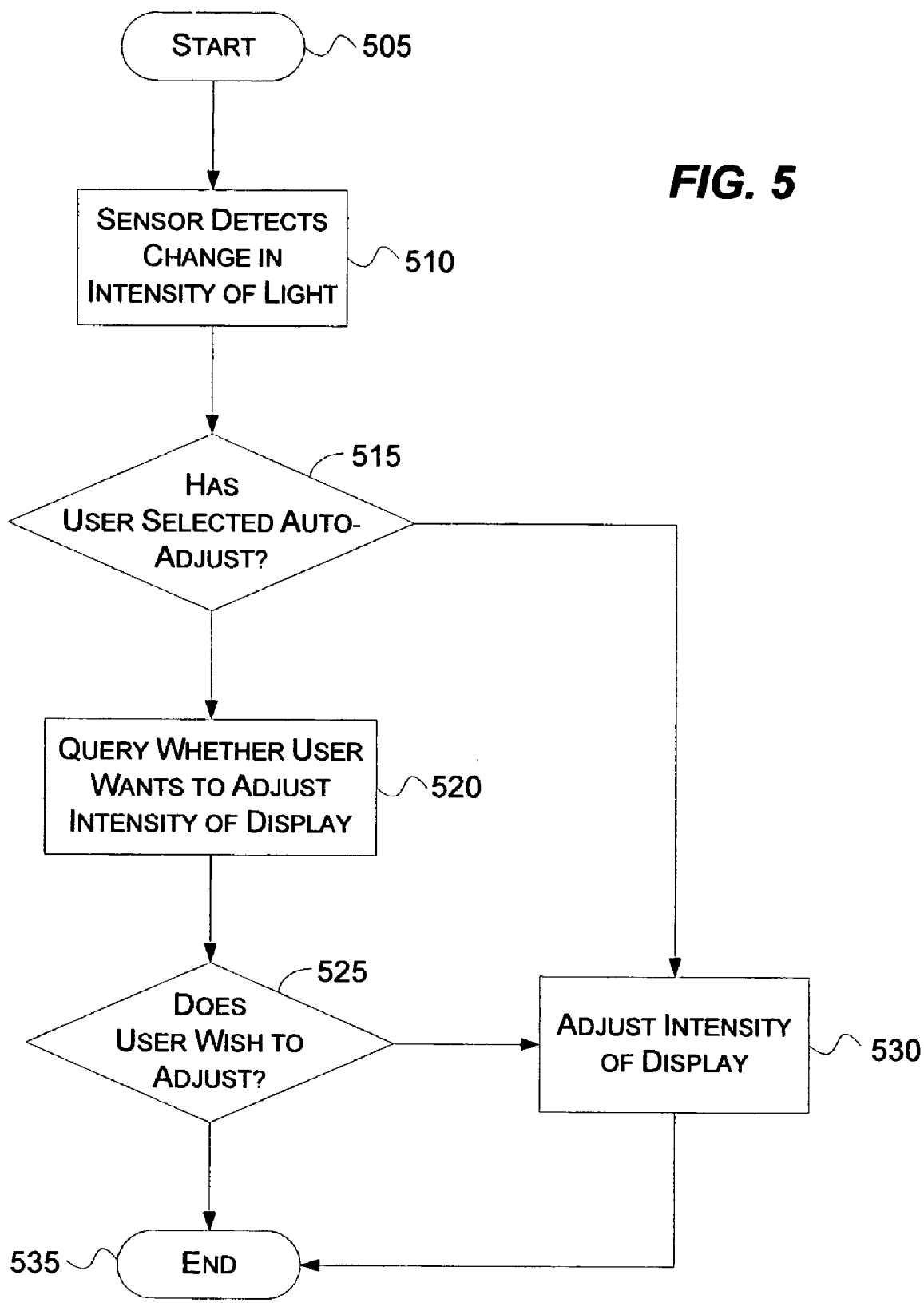
FIG. 5 is a dataflow diagram that generally represents exemplary steps that may occur to adapt to changing light conditions in accordance with various aspects of the present invention.

FIG. 5 is a dataflow diagram that generally represents exemplary steps that may occur to adapt to changing light conditions in accordance with various aspects of the invention. The process begins at block 505.

At block 510 a sensor detects a change in the intensity of light incident to a display. At block 515, a determination is made as to whether the user has selected auto-adjust. If so, processing branches to block 530; otherwise, processing branches to block 520. At block 520, the user is asked whether he or she wants to adjust the intensity of the display. At block 525, if it is determined that the user desires to have the intensity of the display adjusted, processing branches to block 530; otherwise processing branches to block 530. At block 530, the intensity of the display is adjusted. At block 535, processing ends.

Figure 6:
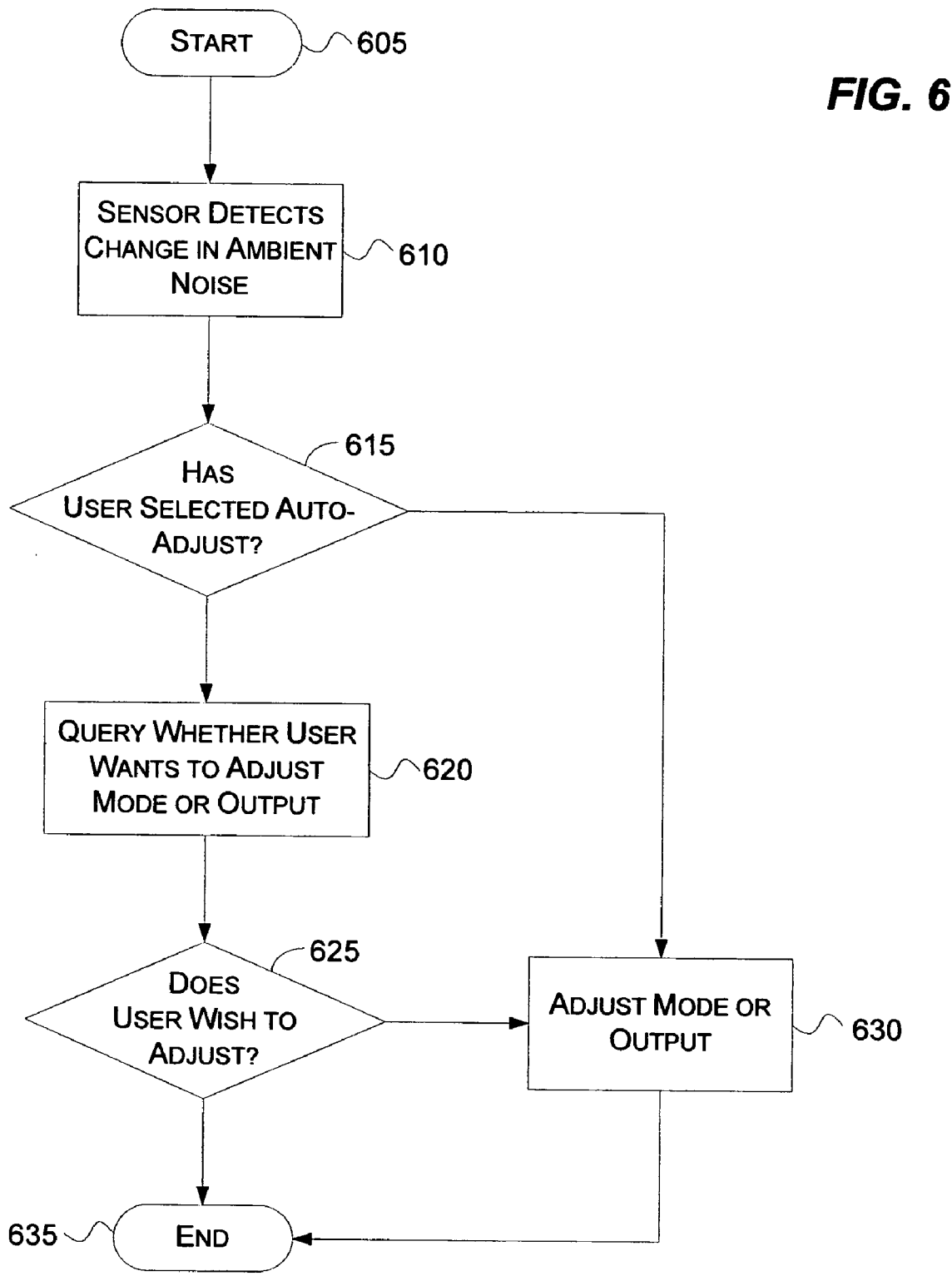
FIG. 6 is a dataflow diagram that generally represents exemplary steps that may occur to adapt to changing ambient noise conditions in accordance with various aspects of the invention.

FIG. 6 is a dataflow diagram that generally represents exemplary steps that may occur to adapt to changing ambient noise conditions in accordance with various aspects of the invention. The process is similar to that described in conjunction with FIG. 5. One difference, however, occurs in blocks 620 and 630. Instead of increasing the volume of a speaker to compensate for the noise, a different mode of communication (e.g., a display) may be selected to communicate information to the user. Another difference is that if the data is sensitive as evaluated at step 618, even if the user has selected an automatic change, the user may be queried at step 620 so that a user will not have sensitive information inadvertently become audible, displayed and/or printed. For example, a financial application program can send an event to the ACE and/or set a flag indicating that the output may be sensitive. Also, independent of the application program, the user may designate to the ACE that certain application have sensitive data and thus automatic mode changes or other adjustments should not be made when these programs have their data output. Such independent designation allows application programs that are not written to be aware of the ACE to benefit from ACE technology.

The dataflow diagrams in FIGS. 5 and 6 include exemplary steps that may occur to adapt to changing environmental conditions. It will be recognized that many other variations may be implemented without departing from the spirit or scope of the present invention.

As can be seen from the foregoing detailed description, there is provided an improved method and system for adapting computing devices to their environments. While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

What is claimed is:

1. One or more tangible computer-readable storage media having executable instructions stored there on that, when executed by a computing device, implement a method comprising:

storing a preferences and settings database that stores user preferences and settings;

executing an adaptive computing environment (ACE) engine on the computing device, the ACE engine continually monitoring data from sensors of the computing device to detect changes in environment of the computing device, the environment including a user of the computing device, the ACE engine continually monitoring data from one or more user input devices to detect user behavior while the user interacts with arbitrary applications, the ACE engine, in accordance with the monitoring, altering the preferences and settings and controlling features of the arbitrary applications that the user interacts with, the ACE engine executing separately from the arbitrary applications and adapting the computing device according to the preferences and settings database;

providing a user interface, the user interface for displaying windows for different applications;

detecting, by the monitoring of the ACE engine, a user characteristic or behavior; and simplifying, by the controlling of user interface features by the ACE engine, the plurality of features provided to the user in response to the detected user characteristic or behavior, the simplifying comprising removing from one of the arbitrary applications advanced configuration options that are settable by the user to configure behavior of the one of the arbitrary applications, the advanced configuration options comprising user interface components that can be manipulated by the user to set options affecting behavior of the one of the arbitrary applications, the removing comprising causing the advanced configuration options to not be settable by the user thereby preventing the user from setting the configuration options by the user, wherein the ACE engine comprises an application separate from the one of the arbitrary applications.

2. The tangible computer-readable storage medium of claim 1, further comprising determining whether the user has indicated that the plurality of features are to be simplified.

3. The tangible computer-readable storage medium of claim 1, wherein the user characteristic or behavior that is detected comprises an increased level of user anxiety, and the detecting is based on input from a galvanic skin response strip.

4. One or more tangible computer-readable storage media according to claim 1, wherein the detecting is performed with galvanic skin response.

5. One or more tangible computer-readable storage media according to claim 1, wherein simplifying further comprises displaying a hint, wizard, or help assistant.

6. One or more tangible computer-readable storage media storing information to enable a computer to perform a process, the process comprising:

storing a database of user preferences/settings;

monitoring an environmental state of the computer, the environmental state comprising information indicating levels of ambient light and sound received by the computer from its local environment, the environmental state further comprising information about peripheral devices attached to the computer, the environmental state further comprising inferences about a user's input or output needs derived from detecting patterns of use of an input device of the computer when using a plurality of arbitrary applications;

responsive to detected changes of the monitored environmental state, displaying user interface components configured to allow a user to indicate respective preferences/settings corresponding to respective detected changes of the monitored environmental state, and storing the indicated preferences/settings in the database of user preferences/settings;

according to the monitored environmental state and the inferences about a user's input, detecting a user characteristic and in response automatically disabling advanced configuration options of one or more of the arbitrary applications such that functionality of the one or more applications is disabled;

providing the stored user preferences/settings to arbitrary applications outputting audio and/or graphical data, the applications adapting how they render the audio and/or video data in accordance with the stored user preferences/settings; and providing the stored user preferences/settings to the plurality of arbitrary applications receiving input from the user, the arbitrary applications adapting how they receive or interpret user input according to the stored user preferences/settings.

7. One or more tangible computer-readable storage media having executable instructions stored there on that, when executed by a computing device, implement a method comprising:

storing a preferences and settings database that stores user preferences and settings;

executing an adaptive computing environment (ACE) engine on the computing device, the ACE engine continually monitoring data from sensors of the computing device to detect changes in environment of the computing device, the environment including a user of the computing device, the ACE engine continually monitoring data from one or more user input devices to detect user behavior while the user interacts with arbitrary applications, the ACE engine, in accordance with the monitoring, altering the preferences and settings and controlling features of the arbitrary applications that the user interacts with, the ACE engine executing separately from the arbitrary applications and adapting the computing device according to the preferences and settings database;

providing a user interface, the user interface for displaying windows for different applications;

identifying, by the monitoring of the ACE engine of the use of the input devices, a behavior characteristic of the user, where the use of the user input devices comprises use that directs input to a plurality of different applications running on the computing device; and simplifying, by the controlling of user interface features by the ACE engine, the plurality of features provided to the user in response to the behavior characteristic of the user, the simplifying comprising removing from one of the arbitrary applications advanced configuration options that are settable by the user to configure behavior of the one of the arbitrary applications, the advanced configuration options comprising user interface components that can be manipulated by the user to set options affecting behavior of the one of the arbitrary applications, the removing comprising causing the advanced configuration options to not be settable by the user thereby preventing the user from setting the advanced configuration options by the user, wherein the ACE engine comprises an application separate from the one of the arbitrary applications.

* * * * *